United States Patent
Carney (10) Patent No.: US 7,975,815 B2
(45) Date of Patent: Jul. 12, 2011

(54) BRAKE

(76) Inventor: John Joseph Carney, Washington Crossing, PA (US)

( * ) Notice: Subject to any disclaimer, the term of this patent is extended or adjusted under 35 U.S.C. 154(b) by 93 days.

(21) Appl. No.: 12/397,067

(22) Filed: Mar. 3, 2009

(65) Prior Publication Data

US 2009/0218184 A1    Sep. 3, 2009

Related U.S. Application Data (60) Provisional application No. 61/033,128, filed on Mar. 3, 2008.

(51) Int. Cl.
*F16D 51/06* (2006.01)
(52) U.S. Cl. .................................. 188/328; 188/336
(58) Field of Classification Search ............ 188/74, 188/78, 79, 205 R, 206 R, 206 A, 216, 325–342
See application file for complete search history.

(56) References Cited

U.S. PATENT DOCUMENTS

| | | | |
|---|---|---|---|
| 1,273,941 A | 7/1918 | Smith | |
| 1,285,214 A | 11/1918 | Kelley | |
| 1,459,237 A | 6/1923 | Muhleisen | |
| 1,726,046 A * | 8/1929 | Sneed | 188/337 |
| 1,773,584 A | 8/1930 | Keys | |
| 1,774,565 A | 9/1930 | Price | |
| 1,786,638 A | 12/1930 | Wadell | |
| 1,794,348 A | 2/1931 | Chase | |
| 1,823,065 A | 9/1931 | Scruby | |
| 1,865,548 A | 7/1932 | Whitworth | |
| 1,891,185 A | 12/1932 | Miller et al. | |
| 1,898,136 A | 2/1933 | Miller et al. | |
| 1,906,201 A | 4/1933 | Simpson | |
| 1,919,545 A | 7/1933 | Fisher | |
| 1,926,064 A | 9/1933 | Sawtelle | |
| 1,949,070 A | 2/1934 | Barrett | |
| 1,950,260 A | 3/1934 | Nelson | |
| 1,952,130 A | 3/1934 | Harrison et al. | |
| 1,981,957 A | 4/1934 | Kohr | |
| 1,957,635 A | 5/1934 | Evans | |
| 1,960,352 A | 5/1934 | Smith | |

(Continued)

FOREIGN PATENT DOCUMENTS

AU    5254490    10/1990

(Continued)

OTHER PUBLICATIONS

Translation of FR1361516 (Apr. 11, 1963) by esp@cenet online database.

(Continued)

*Primary Examiner* — Christopher P Schwartz
(74) *Attorney, Agent, or Firm* — John S. Child, Jr.; Ourmazd S. Ojan (57) ABSTRACT

A two-piece brake shoe is disclosed wherein each piece of the brake shoe has a free end and an end portion opposite the free end that is designed to be inter-fitting with an end portion of the other piece of the brake shoe. Each piece of the brake shoe has a brake lining on its outer surface. The two pieces of the brake shoe can be assembled together to form a C-shaped brake shoe having a gap between the free ends of the two pieces of the brake shoe. An actuator enlarges the gap between the free ends of the two pieces of the brake shoe to apply a brake in which the two-piece brake shoe is installed.

21 Claims, 7 Drawing Sheets

U.S. PATENT DOCUMENTS

| | | | |
|---|---|---|---|
| 2,016,875 A | 10/1935 | Sneed | |
| 2,032,864 A | 3/1936 | Begg et al. | |
| 2,041,536 A | 5/1936 | Fromaget | |
| 2,057,824 A | 10/1936 | Hard et al. | |
| 2,096,219 A | 10/1937 | White | |
| 2,102,915 A | 12/1937 | Rishel | |
| 2,166,754 A | 7/1939 | Dick | |
| 2,167,935 A | 8/1939 | Borden | |
| 2,174,243 A | 9/1939 | Hawley | |
| 2,206,742 A | 7/1940 | Dodge | |
| 2,207,421 A * | 7/1940 | Tirabasso | 188/367 |
| 2,215,547 A | 9/1940 | Dick | |
| 2,236,345 A | 3/1941 | Mossinghoff | |
| 2,273,223 A | 2/1942 | Sawtelle | |
| 2,293,710 A | 8/1942 | Cadman | |
| 2,330,879 A | 10/1943 | Forbes | |
| 2,596,379 A | 5/1952 | Dodge | |
| 2,768,714 A | 10/1956 | Holdeman et al. | |
| 3,386,535 A | 6/1968 | Bishop et al. | |
| 3,412,835 A | 11/1968 | Goldberg | |
| 3,999,633 A | 12/1976 | Prouhet | |
| 4,024,933 A | 5/1977 | Hinderks | |
| 4,452,346 A | 6/1984 | Stukenborg | |
| 4,456,100 A | 6/1984 | Manaki | |
| 4,573,557 A * | 3/1986 | Shellhause | 188/216 |
| 5,246,093 A * | 9/1993 | Wang | 188/336 |
| 6,705,439 B1 | 3/2004 | Wang | |
| 6,729,449 B1 * | 5/2004 | Doolittle et al. | 188/340 |
| 6,899,205 B2 | 5/2005 | Wang | |
| 7,104,370 B2 | 9/2006 | Wang | |
| 7,677,369 B2 * | 3/2010 | Webster et al. | 188/250 D |

FOREIGN PATENT DOCUMENTS

| | | |
|---|---|---|
| AU | 641146 B2 | 9/1993 |
| CA | 2014413 A1 | 10/1990 |
| DE | 1269454 | 5/1968 |
| EP | 0677676 A1 | 10/1995 |
| EP | 0892190 A2 | 1/1999 |
| EP | 1069333 A2 | 1/2001 |
| EP | 1593871 A2 | 11/2005 |
| FR | 1361516 | 4/1963 |
| GB | 1053617 | 1/1967 |
| GB | 1090058 | 11/1967 |
| JP | 52-24668 | 2/1977 |
| JP | 2-42219 | 2/1990 |

OTHER PUBLICATIONS

Translation of JP52-24668 (Feb. 24, 1977).
Translation of DE1269454 (May 30, 1968).

* cited by examiner

ic
BRAKE

BACKGROUND OF THE INVENTION

1. Field of the Invention

This invention is an improved brake shoe that greatly simplifies brake shoe replacement.

2. Discussion of the Prior Art

Drum brakes and disc brakes are well known in the automotive field. Drum brakes usually include a pair of brake shoes, each of which has an outer brake lining of friction brake material. The shoes are supported by a back plate that is stationary relative to the vehicle chassis, and the shoes are positioned inside a drum that rotates with the wheel and is concentric with the wheel hub. When the brake is applied, the shoes and consequently the brake linings are pressed against the inside surface of the drum to generate a frictional braking force on the wheel of the vehicle.

Disc brakes usually include a caliper that supports a pair of brake pads, each of which has an inner brake lining of friction brake material. The caliper is supported such that it is essentially stationary relative to the vehicle chassis; some limited movement of the caliper parallel to the axis of rotation of the disc is allowed in floating caliper installations to ensure that the disc is gripped evenly on both sides. The brake pads are positioned on either side of the brake disc, which is fixed to and rotates with the wheel and which is concentric with the wheel hub. When the brake is applied, the pads forcefully grip the disc on both sides such that the pads are pressed against respective sides of the disc to generate a frictional braking force on the wheel of the vehicle.

In the typical disc brake the disc is part of a brake rotor that has a central portion that has holes through which the wheel studs extend and that is used to attach the rotor to the wheel once the lug nuts of the wheel are tightened down on the studs. The central portion is in the form of a hollow cylinder extending outward from the annular disc that is capped by a plate having holes for the studs at the end of the hollow cylinder distal from the annular disc. In recent years, several automakers have used the central portion of the disc brake rotor as a drum for a secondary drum brake used in combination with the disc brake on the same wheel. The secondary drum brake is provided with a manual actuation system that is separate from the hydraulic actuation system of the disc brake and is intended to act as a parking brake or an emergency brake. Some manufacturers use a secondary drum brake that uses two brake shoes that are identical in design and operation to typical prior art drum brakes.

U.S. Pat. No. 5,246,093, issued on Sep. 21, 1993, to Nui Wang, illustrates a secondary drum brake that uses a one-piece brake shoe. The brake shoe of Wang has a body that is in the form of a split ring that has a C-shaped form in plan view. Brake linings of friction brake material, also referred to as brake lining material, are mounted on the outer surface of the brake shoe body. When the brake is applied, the actuator pushes the ends of the brake shoe body apart; thus, the actuator presses the brake linings against the inner surface of the central portion of the disc brake rotor, also referred to as the hub of the brake rotor, to generate a frictional braking force on the wheel of the vehicle.

In the brake shoe of Wang, which is now in use in some models of vehicles on the market today, the gap between the ends of the brake shoe, also referred to as the ends of the brake shoe body, is smaller than the diameter of the axle driving the wheel, and the diameter of the center opening of the brake shoe, also referred to as the inner diameter of the brake shoe, is smaller than the outside diameter of the wheel hub. Accordingly, to properly replace the one-piece brake shoe of the type shown by Wang the wheel hub and the axle must first be removed; then, the worn-out brake shoe can be replaced by a new brake shoe, followed by reinstalling the axle and the wheel hub. This procedure undesirably increases the cost of brake shoe replacement because it requires an excessive amount of labor compared with conventional brake shoes.

Some automobile repair shops use an alternative replacement procedure in order to save on labor costs. This procedure involves forcing apart the ends of the brake shoe in order to the get the replacement shoe around the axle; thus, this procedure obviates the need for removing the wheel hub and the axle. However, this procedure causes the brake shoe to be warped such that the brake shoe may interfere with the brake drum or rotor hub even when the brake is not being applied in view of the fact that the clearance between the brake lining and the hub is on the order of several hundredths of an inch when the brake is not being applied. This alternative procedure also causes problems with adjustment of the brake after shoe replacement because the warped condition of the brake shoe makes it harder to find an adjustment setting for the brake actuator that keeps the break lining out of engagement with the rotor hub when the brake is not being applied and that presses the brake lining against the inner surface of the rotor hub with the required force within the range of motion of the actuator or the actuator lever. In addition, once the one piece brake shoe of Wang is warped, the original shape of the brake shoe will be nearly impossible to recover. The ends of the brake shoe body must be forced apart or forced toward one another until a satisfactory shape approaching the original shape of the shoe is obtained by trial and error. Needless to say, all these adjustments are difficult, laborious, and time-consuming, so that the advantages of warping the brake shoe in the first place are negated.

Furthermore, the brake linings of the brake shoe of Wang are ground to a circular arc matching the inner surface of the brake rotor hub or drum while the brake shoe is held in a jig that holds the brake shoe body in the same geometric configuration as the brake shoe body assumes when the brake is applied. This grinding procedure ensures that the surface of the brake linings evenly contacts the inner surface of the brake rotor hub or drum when the brake is applied, so that both the brake linings and the inner surface of the brake rotor hub or drum wear evenly and last longer. The benefits of this painstaking grinding step are negated when the brake shoe is warped in order to the get the brake shoe around the axle because most likely the original shape of the brake shoe and brake linings cannot be recovered with the exactness required.

SUMMARY OF THE INVENTION

The present invention is directed to a two-piece brake shoe that can serve as a replacement for the one-piece brake shoe of the prior art discussed above. The two-piece design of the present invention overcomes all the drawbacks noted above with respect to the prior art.

A two-piece brake shoe is disclosed wherein each piece of the brake shoe has a free end and an end portion opposite the free end that is designed to be inter-fitting with an end portion of the other piece of the brake shoe. Each piece of the brake shoe has a brake lining on its outer surface. The two pieces of the brake shoe can be assembled together to form a C-shaped brake shoe having a gap between the free ends of the two pieces of the brake shoe. An actuator enlarges the gap between the free ends of the two pieces of the brake shoe to apply a brake in which the two-piece brake shoe is installed.

In general, the present invention relates to a two-piece brake shoe for use with a brake assembly including an inner cylindrical surface that rotates with a wheel such that torque applied to the inner cylindrical surface is transmitted to the wheel, the two-piece brake shoe comprising:

a first piece comprising a first piece body having a free end and a first connecting portion, the first piece body being elongated and curved; and a second piece comprising a second piece body having a free end and a second connecting portion, the second piece body being elongated and curved;

the first connecting portion being adapted for being fitted to the second connecting portion to form a brake shoe body that has a first free end and a second free end defining a gap between them, the free end of the first piece defining the first free end and the free end of the second piece defining the second free end, the gap of the brake shoe body being adapted for engagement by an actuating mechanism capable of spreading apart the firs and second ends to thereby place the brake shoe in an engaged condition wherein the brake shoe exerts a braking force on the inner cylindrical surface, the brake shoe body being resilient such that it can assume the engaged condition and a disengaged condition wherein the brake shoe does not exert a braking force on the inner cylindrical surface, and the brake shoe body being self-biased toward the disengaged condition.

The two pieces of the brake shoe of the present invention fit together to form a split ring that has a C-shaped form in plan view and that approximately follows a circular arc. In the disclosed embodiment, the two pieces of the brake shoe are fitted together without using fasteners or tools. In the disclosed embodiment, one piece of the two-piece brake shoe has a portion of reduced outer dimensions that is telescopically received into a portion of the other piece of the two-piece brake shoe in order to fit the two-pieces together. The two pieces of the two-piece brake shoe can be fitted together in the manner described above around the axle, such that the brake shoe can be replaced without the need to remove the wheel hub or the axle and without the need to warp or deform the brake shoe or either of its pieces. Once the two-piece brake shoe is installed and the brake actuator is properly adjusted, the brake actuator will fill the gap between the free ends of the brake shoe at all times; thus, the two pieces of the brake shoe cannot come apart after the two-piece brake shoe is installed on a vehicle. In the disclosed embodiment, one piece of the two-piece brake shoe is provided with a tubular portion of rectangular cross section of reduced outer dimensions that is telescopically received into a tubular portion, also of rectangular cross section, of the other piece of the two-piece brake shoe in order to fit the two-pieces together.

Once installed the two-piece brake shoe operates in the same manner as the one-piece brake shoes of the prior art. With the two pieces of the brake shoe fitted together, the two-piece brake shoe has a body that is in the form of a split ring that has a C-shaped form in plan view. Brake linings of friction brake material are mounted on the outer surface of each piece of the two-piece brake shoe such that the two-piece brake shoe has two brake linings mounted on the outer surface of the body of the two-piece brake shoe. When the brake is applied, the actuator lever is pulled by a cable attached to a lever or pedal such as the parking brake lever, which in turn forces the actuator pistons outward. The actuator pistons push the ends of the two-piece brake shoe body apart; thus, the actuator presses the brake linings against the inner surface of the brake rotor hub to generate a frictional braking force on the wheel of the vehicle. When the two-piece brake shoe is installed in a regular drum brake, the actuator may be of the hydraulic type. The resilience of structure of the body of the two-piece brake shoe self-biases the two-piece brake shoe toward the released configuration in which the brake linings no longer contact the inner surface of the brake rotor hub or drum. Therefore when the brake is released, such as by releasing the parking brake lever, the two-piece brake shoe returns to the released configuration due to the two-piece brake shoe being self-biased toward the released configuration.

The change in the gap between the free ends of the brake shoe as the brake is applied and released is in the range of 0.010 to 0.030 inches.

The advantages and other objects of the present invention will become apparent from the detailed description of the invention and the attached drawings that follow herein.

BRIEF DESCRIPTION OF THE DRAWINGS

The same reference numerals indicate identical parts throughout the attached drawings.

DETAILED DESCRIPTION OF THE INVENTION

Figure 1:
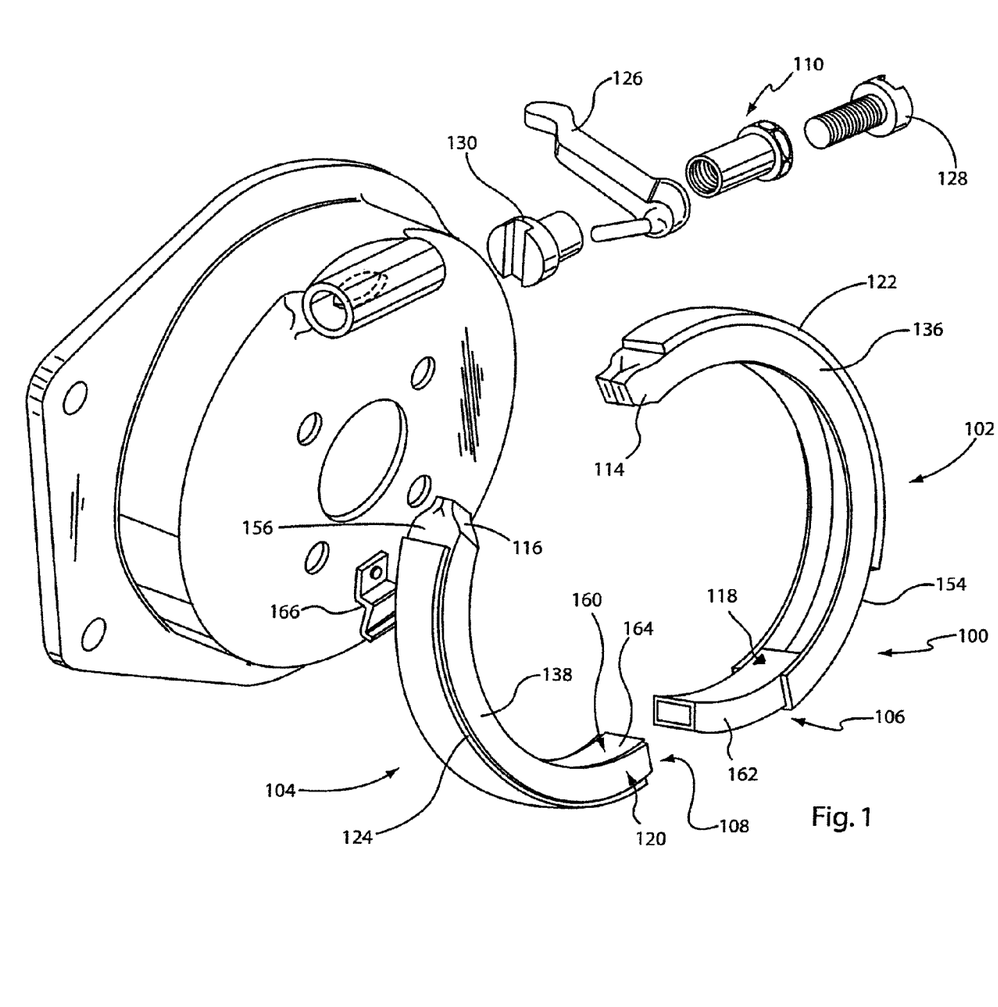
FIG. 1 shows an exploded environmental view of a first embodiment of the brake shoe of the present invention.
Figure 2:
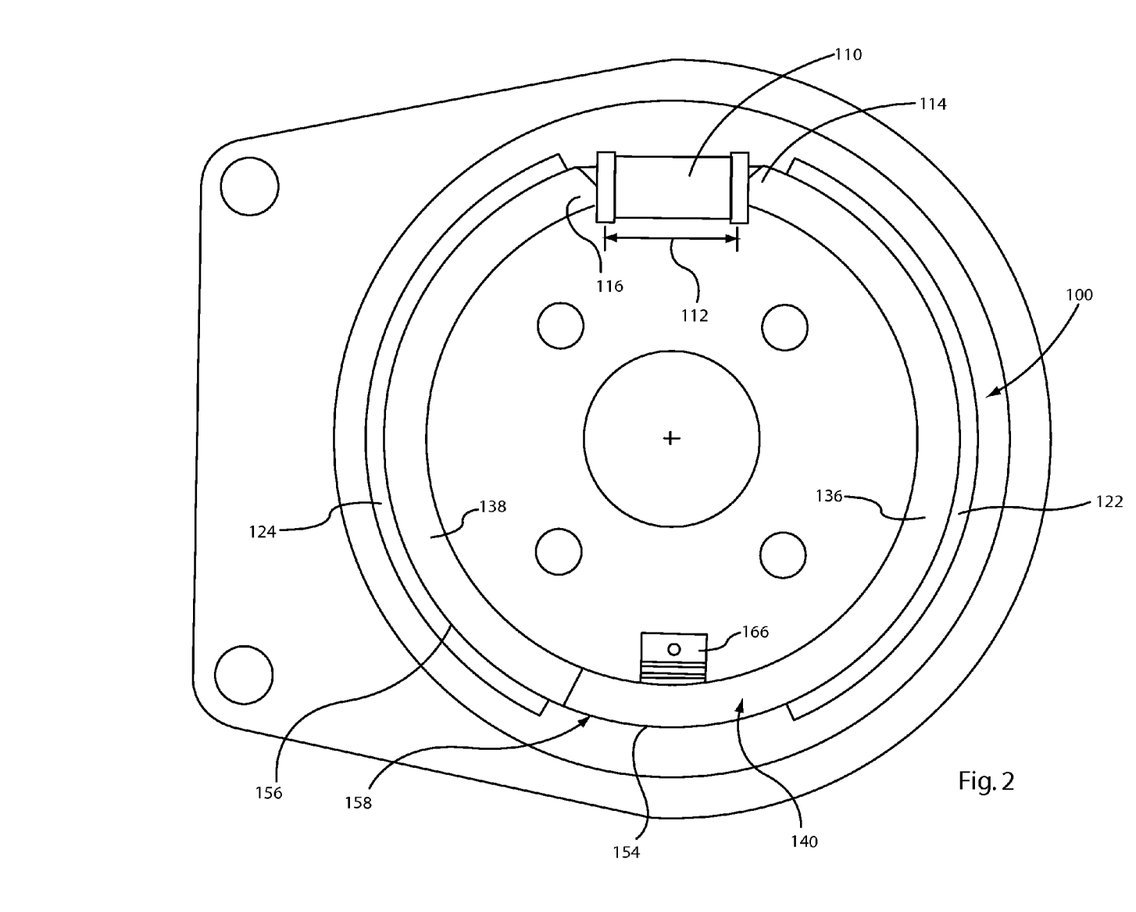
FIG. 2 shows an environmental view of the first embodiment of the brake shoe of the present invention in the fully assembled condition.
Figure 3:
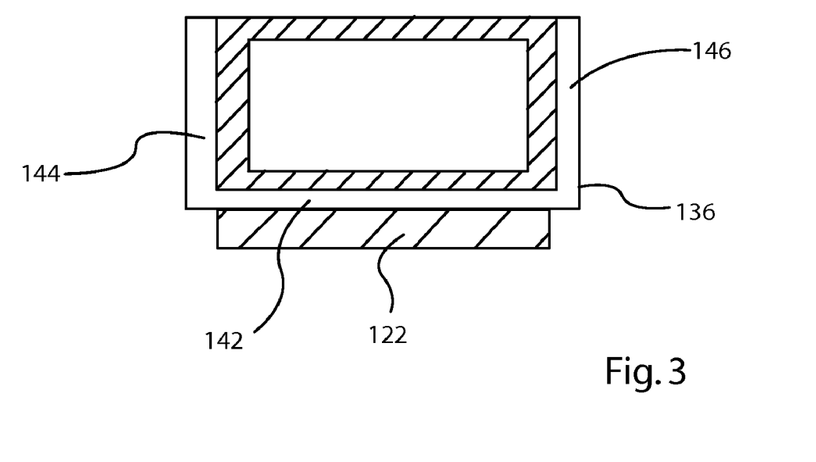
FIG. 3 shows a cross sectional view of the connecting portion of the first piece of the two-piece brake shoe shown in FIG. 1.
Figure 4:
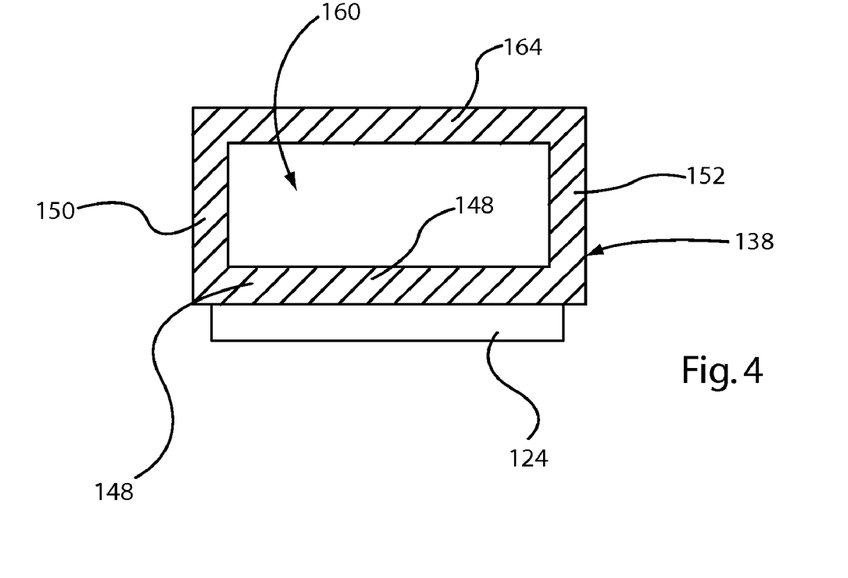
FIG. 4 shows a cross sectional view of the connecting portion of the second piece of the two-piece brake shoe shown in FIG. 1.
Figure 5:
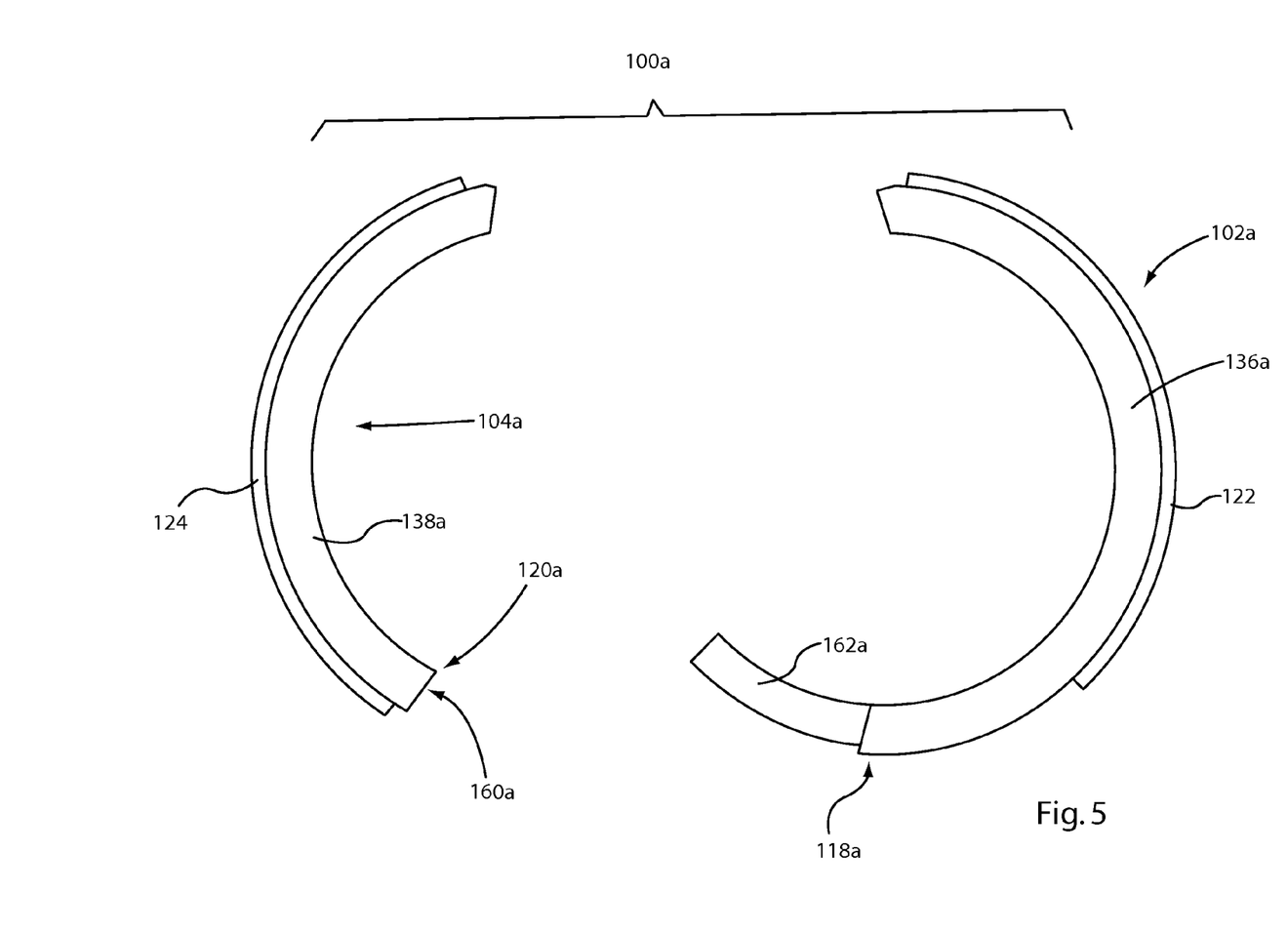
FIGS. 5-10 show views of a second embodiment of the two-piece brake shoe of the present invention.
Figure 6:
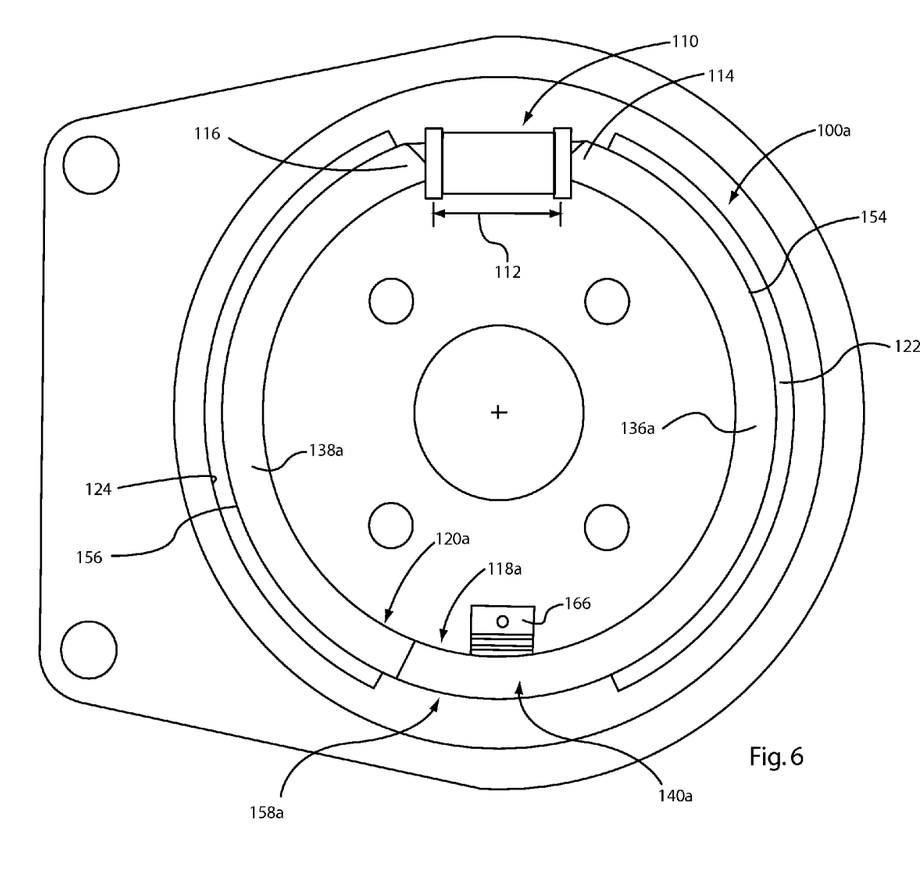
Figure 7:
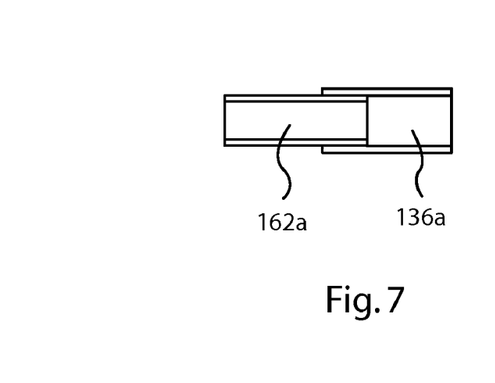
Figure 8:
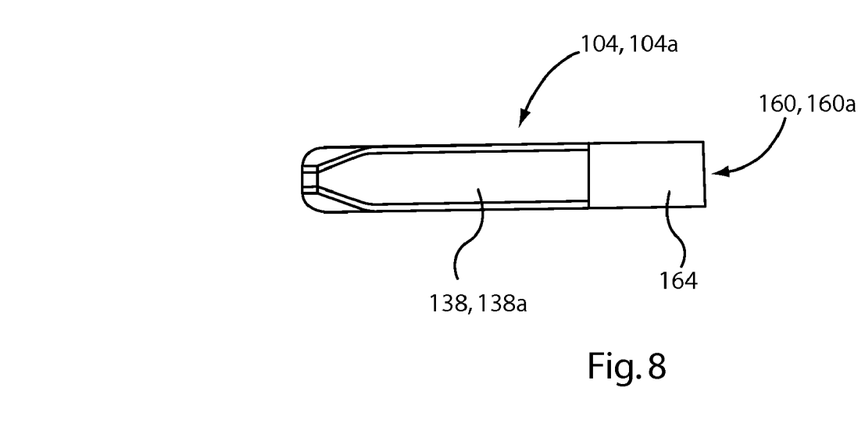
Figure 9:
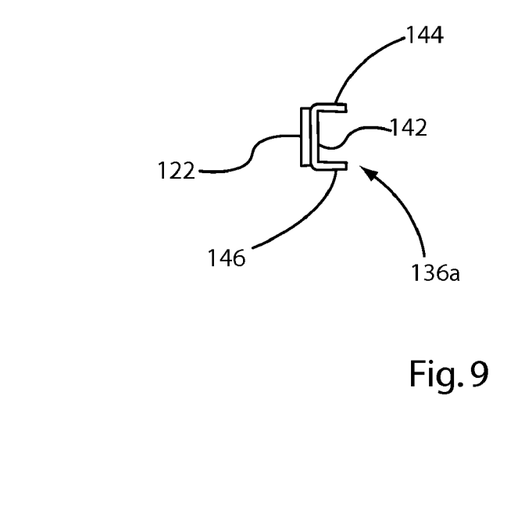
Figure 10:
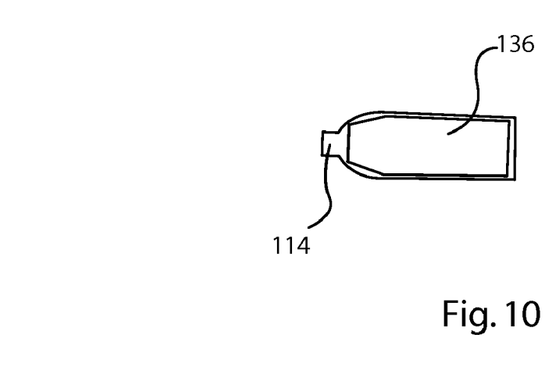
Figure 11:
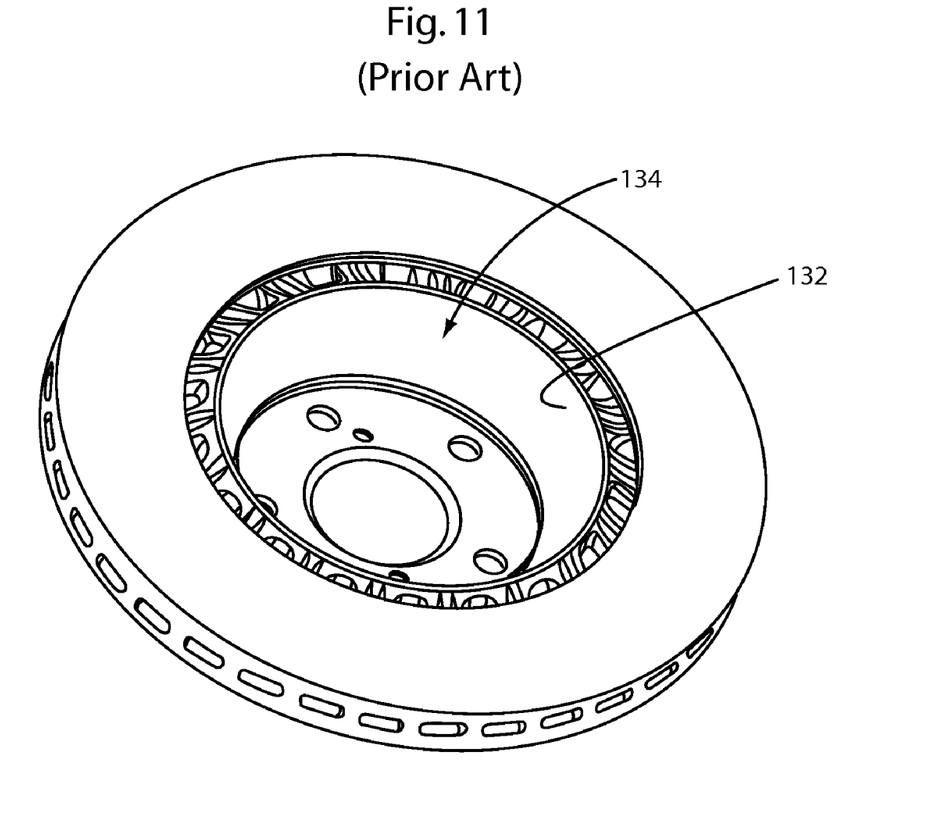
FIG. 11 shows a diagrammatic, perspective view of a prior art brake rotor that generally illustrates the surface that is to be engaged by the brake shoe of the present invention when it is used in a parking or emergency brake.

Referring to FIGS. 1-11, an illustrative embodiment 100 of the two-piece brake shoe of the present invention can be seen. The two pieces 102 and 104 of the brake shoe 100 of the present invention fit together to form a split ring that has a C-shaped form in plan view and that approximately follows a circular arc. In the disclosed embodiment, the two pieces 102, 104 of the brake shoe are fitted together without using fasteners or tools. In the disclosed embodiment, the first piece 102 of the two-piece brake shoe has a portion 106 of reduced outer dimensions that is telescopically received into a portion 108 of the second piece 104 of the two-piece brake shoe in order to fit the two-pieces together. The two pieces 102, 104 of the two-piece brake shoe can be fitted together in the manner described above around the axle, such that the brake shoe can be replaced without the need to remove the wheel hub or the axle and without the need to warp or deform the brake shoe or either of its pieces. Once the two-piece brake shoe 100 is installed and the brake actuator 110 is properly adjusted, the brake actuator 110 will fill the gap 112 between the free ends 114 and 116 of the brake shoe 100 at all times; thus, the two pieces of the brake shoe cannot come apart after the two-piece brake shoe is installed on a vehicle. In the disclosed embodiment, the first piece 102 of the two-piece brake shoe is provided with a tubular portion 118 of rectangular cross section of reduced outer dimensions that is telescopically received into a tubular portion 120, also of rectangular cross section, of the second piece 104 of the two-piece brake shoe in order to fit the two-pieces 102, 104 together.

Once installed the two-piece brake shoe 100 operates in the same manner as the one-piece brake shoes of the prior art. With the two pieces of the brake shoe 100 fitted together, the two-piece brake shoe has a body that is in the form of a split ring that has a C-shaped form in plan view. Brake linings 122, 124 of friction brake material are mounted on the outer surface of each piece 102, 104 of the two-piece brake shoe such that the two-piece brake shoe has two brake linings mounted on the outer surface of the body of the two-piece brake shoe 100. When the brake is applied, the actuator lever 126 is pulled by a cable attached to a lever or pedal such as the parking brake lever, which in turn forces the actuator pistons 128, 130 outward. The actuator pistons push the ends 114 and 116 of the two-piece brake shoe body apart; thus, the actuator 110 presses the brake linings 122, 124 against the inner surface 132 of the brake rotor hub 134 to generate a frictional braking force on the wheel of the vehicle. When the two-piece brake shoe 100 is installed in a regular drum brake, the actuator may be of the hydraulic type. The resilience of structure of the body of the two-piece brake shoe 100 self-biases the two-piece brake shoe toward the released configuration in which the brake linings no longer contact the inner surface 132 of the brake rotor hub or drum. Therefore, when the brake is released, such as by releasing the parking brake lever, the two-piece brake shoe 100 returns to the released configuration due to the two-piece brake shoe being self-biased toward the released configuration.

The change in the gap between the free ends 114, 116 of the brake shoe as the brake is applied and released is in the range of 0.010 to 0.030 inches.

Referring again to FIGS. 1-11, the two-piece brake shoe 100 is intended for use with a brake assembly that includes an inner cylindrical surface 132 that rotates with a wheel such that torque applied to the inner cylindrical surface is transmitted to the wheel. The two-piece brake shoe 100 comprises a first piece 102 and a second piece 104.

The first piece 102 includes a first piece body 136 having a free end 114 and a first connecting portion 118. The first piece body 136 is elongated and curved. The second piece 104 includes a second piece body 138 having a free end 116 and a second connecting portion 120. The second piece body 138 is elongated and curved.

The first connecting portion 118 is adapted for being fitted to the second connecting portion 120 to form a brake shoe body 140 that has a first free end 114 and a second free end 116, which defines a gap 112 between the free ends. The free end 114 of the first piece 102 defines the first free end of the brake shoe body 140, and the free end 116 of the second piece 104 defines the second free end of the brake shoe body 140. The gap 112 of the brake shoe body 140 is adapted for engagement by an actuating mechanism 110 that is capable of spreading apart the first and second ends 114 and 116 to thereby place the brake shoe in an engaged condition in which the brake shoe exerts a braking force on the inner cylindrical surface 132. The brake shoe body 140 is resilient such that it can assume the engaged condition just described and a disengaged condition. When in the disengaged condition, the brake shoe 100 does not exert a braking force on the inner cylindrical surface 132. The brake shoe body 140 is self-biased toward the disengaged condition due to its internal resilience or springiness.

The first piece body 136 at least in part has a cross section in the form of a rectangular channel having a transverse plate 142 extending between parallel side plates 144 and 146 that are each substantially perpendicular to the transverse plate 142 and extend from the transverse plate in the same direction. Similarly, the second piece body 138 at least in part has a cross section in the form of a rectangular channel having a transverse plate 148 extending between parallel side plates 150 and 152 that are each substantially perpendicular to the transverse plate 148 and extend from the transverse plate in the same direction. In the illustrated embodiment, the majority of each of the first piece body 136 and the second piece body 138, excluding the first and second connecting portions and the end portions 114 and 116, is of the form of the rectangular channel as just described.

The two-piece brake shoe 100 is in an assembled condition when the first connecting portion 118 is fitted to the second connecting portion 120. In the assembled condition, the outer surface 154 of the first piece body 136 and the outer surface 156 of the second piece body 138 together form the outer surface 158 of the brake shoe body 140. The brake shoe 100 can be placed in the assembled condition without the use of tools or fasteners. The outer surface 158 of the brake shoe body 140 substantially extends in the form of a strip between the first free end 114 and the second free end 116. In the illustrated embodiments, the first piece body 136 and the second piece body 138 assemble together to form the brake shoe body 140 that is C-shaped in plan view. The two-piece brake shoe 100 further includes at least one brake liner of friction brake material. The brake liner should cover enough of the outer surface 158 of the brake shoe body 140 such that no part of the brake shoe body 140 can come into contact with the inner cylindrical surface 132 when the brake is applied. The outer surface 158 of the brake shoe body 140 is configured to maintain the brake liner in face-to-face relationship with the inner cylindrical surface 132. Accordingly, The outer surface 158 of the brake shoe body 140 approximately follows a circular arc that parallels the inner cylindrical surface 132.

In the illustrated embodiment of FIGS. 1-4, the two-piece brake shoe 100 includes two brake liners 122 and 124. The first brake liner 122 is provided on the outer surface of the first piece body 136, and the second brake liner 124 is provided on the outer surface of the second piece body 138. The outer surface 154 of the first piece body 136, the outer surface 156 of the second piece body 138, and consequently the brake shoe body 140 are configured to maintain the first and second brake liners 122,124 in face-to-face relationship with the inner cylindrical surface 132. The brake liners are usually made of Aramid-containing, TWARON®-containing or other composites; however, any known material suitable for use as brake lining, including asbestos containing materials where the applicable law permits, may be used for the brake liners without departing from the scope of the present invention.

In the two-piece brake shoe of the present invention, the first connecting portion 118, 118a at least in part has a smaller dimension than the second connecting portion 120, 120a, such that the first connecting portion 118, 118a at least in part fits into the second connecting portion 120, 120a. This arrangement allows the brake shoe 100 to be placed in the assembled condition without the use of tools or fasteners. The first connecting portion 118, 118a may telescopically fit into the second connecting portion 120, 120a as in the illustrated embodiments. In the illustrated embodiments, the second connecting portion 120, 120a comprises a receptacle 160, 160a, and at least a portion of the first connecting portion 118, 118a fits into the receptacle 160, 160a.

In the illustrated embodiment of FIGS. 1-4, the first connecting portion 118 at least in part is curved and tubular forming the tubular portion 162 of the first connecting portion 118 of the first piece body 136. The tubular portion 162 is formed by welding a length of steel tubing to the end portion of the rectangular channel forming the first piece body 136 that is distal from the free end 114. The length of steel tubing is positioned such that it is coaxial with and lies in part within the rectangular channel forming the first piece body 136 before it is welded in place. In the illustrated examples, the rectangular channel forming the first piece body 136 and the rectangular channel forming the second piece body 138 are of the same size. The length of steel tubing and consequently the tubular portion 162 have outer dimensions that are small enough such that the length of steel tubing can fit within the rectangular channel forming the first piece body 136 and within the rectangular channel forming the second piece body 138. The length of steel tubing forming the tubular portion 162 is preferably of rectangular cross section so that it is afforded the maximum support by the rectangular channel forming the first piece body 136 and the rectangular channel forming the second piece body 138.

A plate 164 is welded to the end portion of the rectangular channel forming the second piece body 138 that is distal from the free end 116, in order to form the curved and tubular portion of the second piece body 138 that forms the receptacle 160. The plate 164 bridges, i.e. extends between, the parallel side plates 150 and 152 near their ends that are distal from the transverse plate 148; therefore, the plate 164 closes off the rectangular channel forming the second piece body 138 over the portion distal from the free end 116 to form the curved and tubular portion of the second piece body 138 that forms the receptacle 160. Thus, the second connecting portion 120 at least in part is curved and tubular forming the receptacle 160. The receptacle 160 is curved and follows the curvature of the second piece body 138 and consequently of the brake shoe body 140. The tubular part 162 of the first connecting portion 118 is also curved and follows the curvature of the first piece body 136 and consequently of the brake shoe body 140; thus, the tubular part 162 of the first connecting portion 118 can telescopically fit into the receptacle 160 of the second connecting portion 120 such that the tubular portion 162 can be inserted into or withdrawn from the receptacle 160 before the brake shoe 100 is installed in a brake system.

The tubular portion or part 162 refers to that tubular portion that extends beyond the rectangular channel forming the first piece body 136. When the tubular portion 162 is fully inserted into the receptacle 160 the rectangular channel forming the first piece body 136 abuts the rectangular channel forming the second piece body 138. The curved tubular part 162 of the first connecting portion 118 has a rectangular cross section dimensioned to fit within the receptacle 160 of the second connecting portion 120, which also has a rectangular cross section, such that little or no play exists between the first piece 102 and the second piece 104, while the curved tubular part 162 can still slide back and forth within the receptacle 160. Accordingly, the curved tubular part 162 substantially takes up the entire perimeter of the hollow interior of receptacle 160 when viewed in cross section.

The length of steel tubing forming the tubular portion 162 should preferably extend into the rectangular channel forming the first piece body 136 for about one eighth to about half the length of the steel tubing to ensure adequate contact between the tubing and the rectangular channel forming the first piece body 136 for forming a strong enough weld between the tubing and the rectangular channel forming the first piece body 136. The length of steel tubing forming the tubular portion 162 should be offset from the area opposite the gap 112 so as not to interfere with the engagement of the clip 166 of the brake assembly with the brake shoe body 140.

Referring to FIGS. 5-10, a second embodiment 100a of the two-piece brake shoe of the present invention can be seen. The only difference between the embodiment 100 and the embodiment 100a is that instead of steel tubing a length of steel rectangular channel of lesser outer dimensions, compared to the rectangular channel forming the first piece body 136a, is used to form the channel portion 162a that is to be inserted into the receptacle 160a. The first connecting portion 118a at least in part is in the form of a curved channel 162a of rectangular cross section having lesser outer dimensions compared to the remaining portion of the first piece body 136a. The second connecting portion 120a at least in part is curved and tubular and of rectangular cross section and forms a receptacle 160a in the same manner as described for the receptacle 160. The curved rectangular channel part 162a of the first connecting portion 118a telescopically fits into the receptacle 160a of the second connecting portion 120a to assemble the first piece 102a and the second piece 104a together.

The channel portion or part 162a refers to that portion of the length of rectangular channel of lesser outer dimensions that extends beyond the larger rectangular channel forming the first piece body 136a. When the channel portion 162a is fully inserted into the receptacle 160a the rectangular channel forming the first piece body 136a abuts the rectangular channel forming the second piece body 138a. The curved channel part 162a of the first connecting portion 118a has a rectangular cross section dimensioned to fit within the receptacle 160a of the second connecting portion 120a, which also has a rectangular cross section, such that little or no play exists between the first piece 102a and the second piece 104a, while the curved channel part 162a can still slide back and forth within the receptacle 160a. Accordingly, the curved channel part 162a has outer dimensions that substantially match the dimensions of the perimeter of the hollow interior of receptacle 160a when viewed in cross section.

The length of steel channel forming the channel portion 162a should preferably extend into the larger rectangular channel forming the first piece body 136a for about one eighth to about half the length of the steel channel forming the channel portion 162a to ensure adequate contact between the channel forming the channel portion 162a and the larger rectangular channel forming the first piece body 136a for forming a strong enough weld between the channel forming the channel portion 162a and the larger rectangular channel forming the first piece body 136a. The length of steel channel forming the channel portion 162a should be offset from the area opposite the gap 112a so as not to interfere with the engagement of the clip 166 of the brake assembly with the brake shoe body 140a.

As an alternative to the receptacle and corresponding insert of the illustrative embodiments described above, other receptacle and insert configurations, such as tongue and groove or mortise and tenon joints including those of the dovetail type, can be used to join the two pieces of the two-piece brake shoe 100, 100a together. For example, the side walls of the channel part 162a and of a portion of the rectangular channel forming the second piece body 138, located distal from the end 116, can be bent toward the center of each channel to form a dovetail joint without the need for the plate 164, 164a. In addition, the brake shoe body 140 may be crescent shaped such that it is less wide near the ends 114 and 116. In this case, the receptacle 160, 160a would be wider at the inlet, and the insert 162, 162a would be tapered such that it would be narrower with increasing distance outward from the rectangular channel forming the first piece body 136, 136a.

The inserts 162, 162a preferably project outward from the rectangular channel forming the first piece body 136, 136a for a distance between ¼ to 3/2 times the mean radius of the outer surface 158, 158a of the brake shoe body 140, 140a. Prototype brake shoes fabricated to date have had inserts 162, 162*a* that project outward from the rectangular channel forming the first piece body 136, 136*a* for a distance between ⅜ to 1 times the mean radius of the outer surface 158, 158*a* of the brake shoe body 140, 140*a*.

From the detailed description above, it should be evident that the present invention has many advantages over the one-piece brake shoes of the prior art. Replacement of the brake shoe is easier and faster because the mechanic does not have to pull the axle or force the brake shoe over axle. Brake adjustment is easier because the dimensions and geometry of the brake shoe are not altered by the installation process. For the same reason, the two-piece brake shoe will allow the brake linings to more evenly contact the interior surface of the rotor hub or brake drum, which in turn reduces localized wear and increases the service life of the brake linings. The two-piece design eliminates the need for the mechanic or technician to force brake shoe over the axle during installation, which limits the possibility of damage to the brake shoe during installation. The two-piece construction also allows for the brake shoe to be manufactured largely using conventional equipment used for the manufacture of standard drum brake shoes that are installed in opposing pairs. Shipping costs are reduced compared to that for the one-piece shoe because of the ability to nest pieces in the same package, so although the packages may weigh roughly the same a smaller package with a lower maximum shipping charge can be used for shipping the two-piece brake shoe. The two-piece construction of the brake shoe allows the manufacturer to use existing standard drum brake shoe packaging, which reduces the manufacturer's packaging costs.

The present invention is not limited to the embodiments disclosed above, but includes any and all embodiments within the scope of the appended claims and their equivalents.

The invention claimed is:

1. A two-piece brake shoe for use with a brake assembly including an inner cylindrical surface that rotates with a wheel such that torque applied to the inner cylindrical surface is transmitted to the wheel, the two-piece brake shoe comprising:
    a first piece comprising a first piece body having a free end and a first connecting portion, said first piece body being elongated and curved; and
    a second piece comprising a second piece body having a free end and a second connecting portion, said second piece body being elongated and curved;
    said first connecting portion being adapted for being fitted to said second connecting portion to form a brake shoe body that has a first free end and a second free end defining a gap therebetween, said free end of said first piece defining said first free end and said free end of said second piece defining said second free end, said gap of said brake shoe body being adapted for engagement by an actuating mechanism capable of spreading apart said first and second ends to thereby place the brake shoe in an engaged condition wherein the brake shoe exerts a braking force on the inner cylindrical surface, said brake shoe body being resilient such that it can assume said engaged condition and a disengaged condition wherein the brake shoe does not exert a braking force on the inner cylindrical surface, and said brake shoe body being self-biased toward said disengaged condition.

2. The two-piece brake shoe according to claim 1, wherein said first piece body in part has a cross section in the form of a rectangular channel having a transverse plate extending between parallel side plates that are each substantially perpendicular to said transverse plate and extend from said transverse plate in the same direction, and
    wherein said second piece body at least in part has a cross section in the form of a rectangular channel having a transverse plate extending between parallel side plates that are each substantially perpendicular to said transverse plate and extend from said transverse plate in the same direction.

3. The two-piece brake shoe according to claim 2, wherein the two-piece brake shoe is in an assembled condition when said first connecting portion is fitted to said second connecting portion, and wherein the brake shoe can be placed in said assembled condition without the use of tools or fasteners.

4. The two-piece brake shoe according to claim 3, wherein said brake shoe body is C-shaped in plan view.

5. The two-piece brake shoe according to claim 4, wherein said first piece body has an outer surface and said second piece body has an outer surface, and wherein the two-piece brake shoe further comprises:
    a first brake liner provided on said outer surface of said first piece body; and
    a second brake liner provided on said outer surface of said second piece body.

6. The two-piece brake shoe according to claim 5, wherein said brake shoe body is configured to maintain said first and second brake liners in face-to-face relationship with the inner cylindrical surface.

7. The two-piece brake shoe according to claim 6, wherein said first connecting portion at least in part has a smaller dimension than said second connecting portion, such that said first connecting portion at least in part telescopically fits into said second connecting portion.

8. The two-piece brake shoe according to claim 7, wherein said first connecting portion at least in part is curved and tubular, wherein said second connecting portion at least in part is curved and tubular forming a receptacle, and wherein said curved tubular part of said first connecting portion telescopically fits into said receptacle of said second connecting portion.

9. The two-piece brake shoe according to claim 8, wherein said curved tubular part of said first connecting portion has a rectangular cross section, and wherein said receptacle of said second connecting portion also has a rectangular cross section.

10. The two-piece brake shoe according to claim 7, wherein said first connecting portion at least in part is in the form of a curved channel of rectangular cross section having lesser outer dimensions compared to the remaining portion of said first piece body, wherein said second connecting portion at least in part is curved and tubular and of rectangular cross section and forms a receptacle, and wherein said curved rectangular channel part of said first connecting portion telescopically fits into said receptacle of said second connecting portion.

11. The two-piece brake shoe according to claim 4, wherein the two-piece brake shoe further comprises at least one brake liner, and wherein said brake shoe body has an outer surface substantially extending between said first free end and said second free end, said outer surface being configured to maintain said brake liner in face-to-face relationship with the inner cylindrical surface.

12. The two-piece brake shoe according to claim 1, wherein said first connecting portion at least in part has a smaller dimension than said second connecting portion, such that said first connecting portion at least in part telescopically fits into said second connecting portion.

13. The two-piece brake shoe according to claim 12, wherein said first connecting portion at least in part is curved and tubular, wherein said second connecting portion at least in part is curved and tubular forming a receptacle, and wherein said curved tubular part of said first connecting portion telescopically fits into said receptacle of said second connecting portion.

14. The two-piece brake shoe according to claim 13, wherein said curved tubular part of said first connecting portion has a rectangular cross section, and wherein said receptacle of said second connecting portion also has a rectangular cross section.

15. The two-piece brake shoe according to claim 12, wherein said first connecting portion at least in part is in the form of a curved channel of rectangular cross section having lesser outer dimensions compared to the remaining portion of said first piece body, wherein said second connecting portion at least in part is curved and tubular and of rectangular cross section and forms a receptacle, and wherein said curved rectangular channel part of said first connecting portion telescopically fits into said receptacle of said second connecting portion.

16. The two-piece brake shoe according to claim 1, wherein said first piece body has an outer surface and said second piece body has an outer surface, and wherein the two-piece brake shoe further comprises:
a first brake liner provided on said outer surface of said first piece body; and
a second brake liner provided on said outer surface of said second piece body.

17. The two-piece brake shoe according to claim 16, wherein said brake shoe body is configured to maintain said first and second brake liners in face-to-face relationship with the inner cylindrical surface.

18. The two-piece brake shoe according to claim 1, wherein the two-piece brake shoe is in an assembled condition when said first connecting portion is fitted to said second connecting portion, and wherein the brake shoe can be placed in said assembled condition without the use of tools or fasteners.

19. The two-piece brake shoe according to claim 1, wherein said brake shoe body is C-shaped in plan view.

20. The two-piece brake shoe according to claim 1, wherein the two-piece brake shoe further comprises at least one brake liner, and wherein said brake shoe body has an outer surface substantially extending between said first free end and said second free end, said outer surface being configured to maintain said brake liner in face-to-face relationship with the inner cylindrical surface.

21. The two-piece brake shoe according to claim 1, wherein said second connecting portion comprises a receptacle, and wherein at least a portion of said first connecting portion fits into said receptacle.

* * * * *